(12) United States Patent
Lashina

(10) Patent No.: US 7,786,980 B2
(45) Date of Patent: Aug. 31, 2010

(54) METHOD AND DEVICE FOR PREVENTING STAINING OF A DISPLAY DEVICE

(75) Inventor: Tatiana Lashina, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 868 days.

(21) Appl. No.: 11/570,914

(22) PCT Filed: Jun. 24, 2005

(86) PCT No.: PCT/IB2005/052107
§ 371 (c)(1),
(2), (4) Date: Dec. 19, 2006

(87) PCT Pub. No.: WO2006/003590
PCT Pub. Date: Jan. 12, 2006

(65) Prior Publication Data
US 2008/0278450 A1   Nov. 13, 2008

Related U.S. Application Data

(60) Provisional application No. 60/583,967, filed on Jun. 29, 2004.

(51) Int. Cl.
G06F 3/033 (2006.01)
(52) U.S. Cl. .................................................... 345/173
(58) Field of Classification Search ......... 345/173–178; 178/18.01–19.04
See application file for complete search history.

(56) References Cited

U.S. PATENT DOCUMENTS

2001/0030642 A1   10/2001   Sullivan et al.
2002/0000977 A1   1/2002    Vranish
2002/0027549 A1   3/2002    Hirshberg

FOREIGN PATENT DOCUMENTS

JP      08212005 A   *   8/1996
WO      WO03010486 A2    12/2006

OTHER PUBLICATIONS www.sony.middleast.com/caraudio/glosshead.htm, Dec. 13, 2003.

* cited by examiner

Primary Examiner—Bipin Shalwala
Assistant Examiner—Kelly Hegarty

(57) ABSTRACT

A method and apparatus for preventing staining of a display screen by a user's fingers, by encouraging a user not to touch the surface of a display screen while using a graphic user interface associated with the display screen includes determining a first threshold distance from the display screen within which a user's finger may be detected, determining a second threshold distance from the display screen within which a user's fingers may be detected, the second threshold distance being shorter than the first threshold distance, first detecting when a user's finger is within the first threshold distance, indicating to the user, upon a detection in the first detecting step, that the user's finger has entered a zone proximate to the screen where interaction with a graphical user interface (GUI) is enabled, the GUI enabling manipulating various display functions by movements of the user's finger, second detecting when a user's finger is within the second threshold distance, and indicating to the user, upon a detection in the second detecting step, that the user's finger has entered a forbidden zone.

19 Claims, 3 Drawing Sheets

METHOD AND DEVICE FOR PREVENTING STAINING OF A DISPLAY DEVICE

CROSS REFERENCE TO RELATED CASES

Applicant(s) claim(s) the benefit of Provisional Application Ser. No. 60/583,967, filed Jun. 29, 2004.

The invention relates to display devices, and more particularly to display devices enabling direct manipulation for a graphical user interface (GUI). The invention describes a system and method for a user interface that enables user to interact with the display in its proximity without physically touching the display to prevent staining the display with fingerprints.

Direct manipulation techniques for graphical user interfaces, enabled by touch screen technology, are currently the most natural input techniques since they follow a concept of pointing at an object of interest and manipulating it. Direct manipulation has an extra advantage of integrating the detection hardware, i.e., a so-called touch screen or touch sensor, into the display itself, which provides for compact design of the product and, at the same time, overcomes space limitations. As such, direct manipulation is an attractive interface technique for various consumer display devices, in which the naturalness and intuitiveness of interaction is one of the key requirements.

Most conventional touch screen technologies, like resistive or acoustic wave touch screens, rely on the physical contact between the user's finger and the display. There are many situations where this contact is acceptable, notably automatic teller machines (ATMs). However, in numerous other devices, e.g., display mirrors, interactive displays, interactive tables, wall projections, etc., staining of the display surface with fingerprints is not acceptable due to aesthetic or hygiene reasons. The aesthetics become an issue if the product forms an integral part of the environment. Alternatively, if the product has a double function, like in the case of the interactive table that serves as a table surface and as an interactive display, or display mirrors, such displays should not reveal stains of fingerprints when the display is switched off. Hygiene plays an important role in medical applications. To insure sterility of medical equipment used in surgical environments, it is very desirable to interact with a graphical user interface without physically touching a display.

The interaction style with a display device that makes use of the direct manipulation and, at the same time, avoids staining the surface with fingerprints can be realized by detecting bare-hands manipulations in the proximity of the display surface, where detection technology does not rely on the physical contact with the display surface. Technology-wise, there are a number of alternatives to detect bare hands in the display proximity.

International Patent Application No. WO 03/010486, incorporated herein by reference, discloses object sensing using cross-capacitive sensing. U.S. Patent Application Publication No. US20010030642 discloses numerous techniques for enabling operation of a GUI without requiring the user to actually touch the display screen. However, since these detection techniques rely on the field disturbance and the field is invisible to the user, people have the tendency to touch the display since there is no perceptible physical barrier.

An object of the subject invention is to provide a method and apparatus for preventing staining of a display screen by a user's fingers, by encouraging a user not to touch the surface of a display screen while using a graphic user interface associated with the display screen.

This object is achieved in a method for preventing staining of a display screen by a user's fingers, said method comprising the steps determining a first threshold distance from the display screen within which a user's finger may be detected; determining a second threshold distance from the display screen within which a user's fingers may be detected, said second threshold distance being shorter than said first threshold distance; first detecting when a users finger is within said first threshold distance; indicating to said user, upon a detection in said first detecting step, that said user's finger has entered a zone in the screen proximity where interaction with a graphical user interface (GUI) is enabled, said GUI enabling manipulating various display functions by movements of the user's finger; second detecting when a user's finger is within said second threshold distance; and indicating to said user, upon a detection in said second detecting step, that said user's finger has entered a forbidden zone.

With the above and additional objects and advantages in mind as will hereinafter appear, the invention will be described with reference to the accompanying drawings, in which.

The subject invention makes use of a 3-D display, that is, a display that is capable of detecting the horizontal and vertical position of a pointer, stylus or a user's finger with respect to the surface of the display, as well as the distance of the pointer, stylus or user's finger from the surface of the display. There are various known types of 3-D displays using, for example, infrared sensing, capacitance sensing, etc. One type of a 3-D display is disclosed in U.S. Patent Application Publication No. US2002/0000977 A1, which is incorporated herein by reference.

Figure 1A:
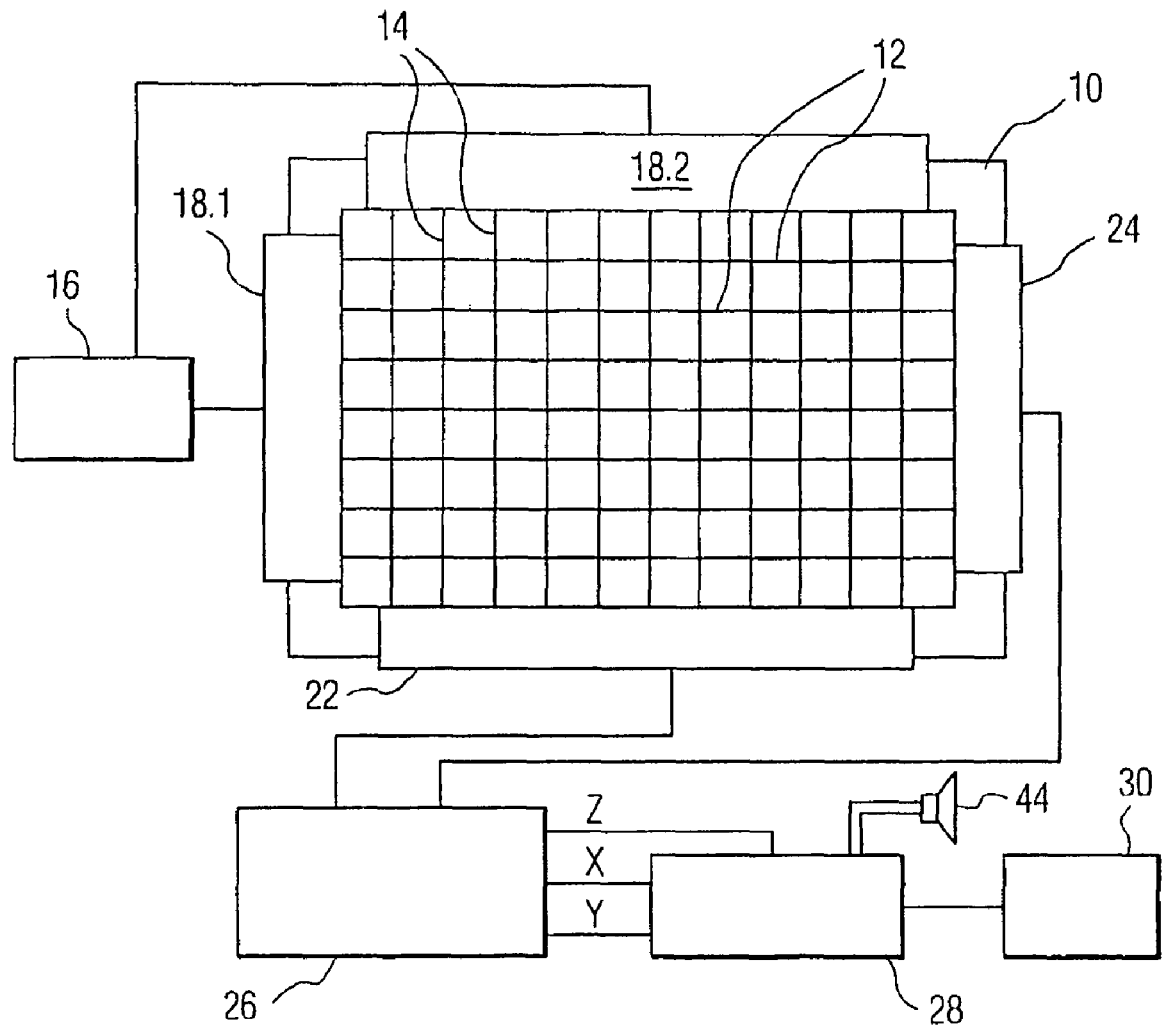
FIG. 1A is a block diagram of a display device having a capacitive sensor array incorporated therein.
Figure 1B:
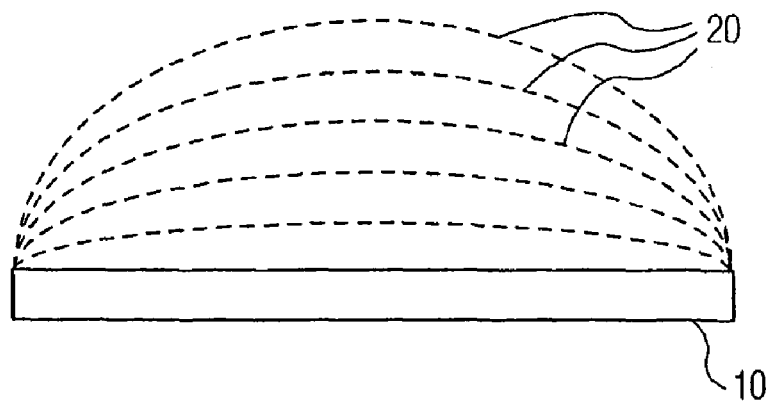
FIG. 1B is a diagram showing the detection lines of the sensor array of FIG. 1A.

As shown in FIG. 1A, a display screen 10 has superimposed thereon a grid of electrically conductive transparent conductors in which the horizontal conductors 12 are electrically isolated from the vertical conductors 14. A voltage source 16 connected to the connection blocks 18.1 and 18.2 applies a voltage differential across the horizontal and vertical conductors 12 and 14. This arrangement develops a detection field 20 extending away from the surface of the display 10 as shown in FIG. 1B, with the horizontal and vertical conductors 12 and 14 acting as plates of a capacitor.

When, for example, a user's finger enters the detection field 20, the capacitance is affected and is detected by X-axis detector 22, connected to the vertical conductors 14 and the Y-axis detector 24, connected to the horizontal conductors 12. A sensor controller 26 receives the output signals from the X and Y detectors 22 and 24 and generates X, Y coordinate signals and a Z distance signal. The X and Y coordinate signals are applied to a cursor and display controller 28 which then applies control signals to an On-Screen Display controller 30.

In an alternate embodiment of the invention, use is made of a semi 3-D display, i.e., a display that is capable of detecting the horizontal and vertical position of a pointer, stylus or user's finger with respect to the surface of the display in the plane parallel to the display surface, defined at a first threshold distance. In addition, such a semi 3-D display is capable of separately detecting whether the user's finger has entered a forbidden zone determined by a second threshold distance in close proximity to the display surface. Such a semi 3-D display can be realized by using a first virtual touch screen positioned at the distance of the first threshold. Typically, a virtual touch screen is constituted from a number of infrared optical emitters (i.e., transmitters) and detectors (i.e., receivers) that are arranged around the periphery of the display screen to create a plurality of intersecting light paths. When the user's finger crosses the plane of the virtual touch screen, his/her finger blocks the optical transmission of certain ones of the perpendicularly arranged transmitter/receiver pairs. Based on the identity of the blocked pairs, the virtual touch screen system can determine the X and Y coordinates of the intersection. The virtual touch screen then detects the moment of entering the first threshold and thus, entering the active zone A and the X,Y coordinates of the pointer, stylus or the user's finger. At the level of the second threshold, a second virtual touch screen is established to check whether the user's finger has crossed the border of the forbidden zone F. This second virtual touch screen can be either identical to the one used at the level of the first threshold, or it can be a simplified virtual touch screen that only detects the user's finger position along either the X or Y axis, since the only interest is in whether the user's finger has entered the forbidden zone, and the X, Y coordinates are obtainable from the readings of the first virtual touch screen positioned at the first threshold level.

Figure 2:
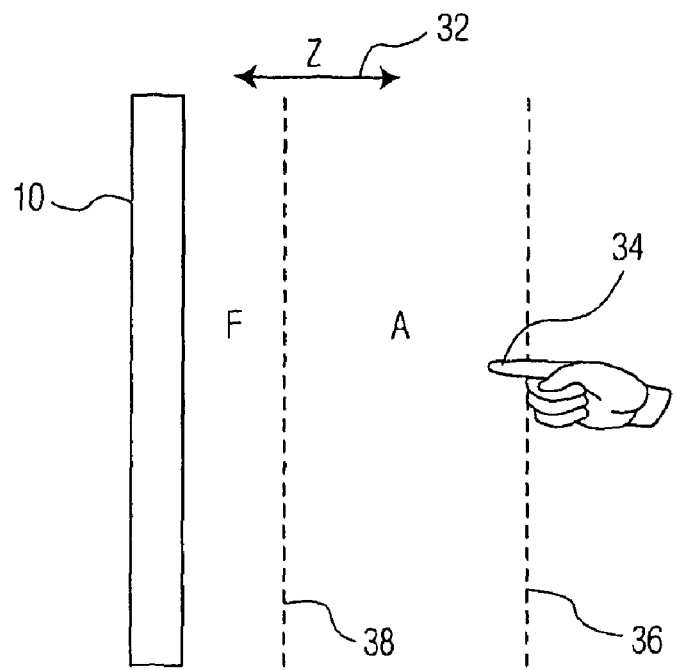
FIG. 2 is a diagram showing the allowed and forbidden zones extending from the surface of the display screen.

As shown in FIG. 2, the cursor and display controller 28 establishes two zones extending in the Z direction (dual-headed arrow 32) from the surface of the display screen 10. A first zone A denotes a zone in which, when the user's finger 34 passes a first threshold distance 36, the user's finger 34 is detected and interaction is permitted. A second zone B denotes a forbidden zone in which, when the user's finger 34 passes a second threshold distance 38, the user's finger 34 is detected but interaction is not permitted. The first threshold distance 36 is, for example, 10 cm. from the surface of the display screen 10, while the second threshold distance 38 is, for example, 3 cm. As such, the allowed interaction zone, i.e., the first zone A, extends from 3 cm. to 10 cm.

Figure 3A:
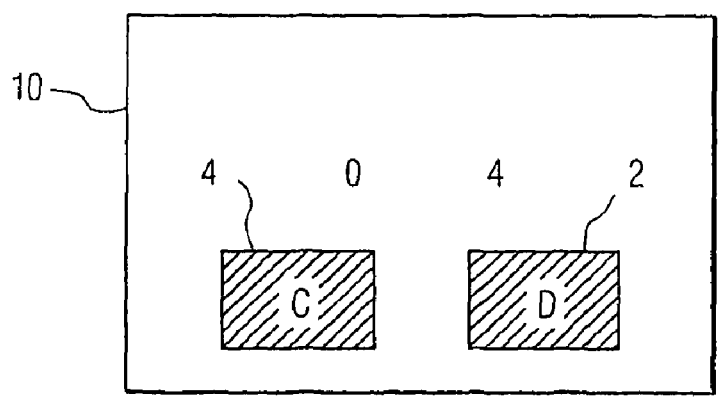
FIGS. 3A and 3B show icons on the display screen in the inactivated and activated states.
Figure 3B:
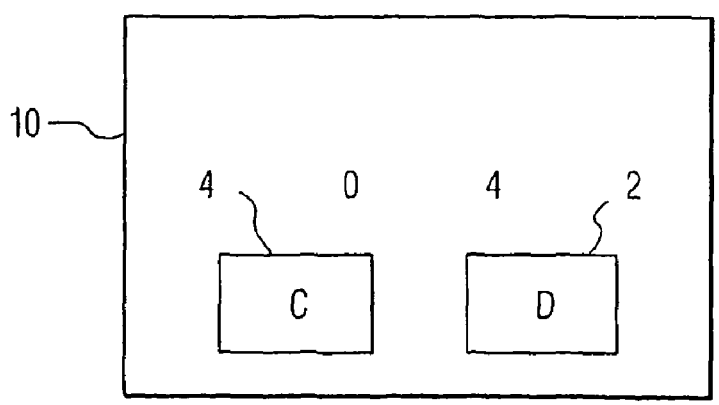

FIGS. 3A and 3B show examples of a display on the display screen 10 in which icons 40 and 42, indicating selections "C" and "D", may be selected by the user. Using the above distance examples, when the user's finger 34 is more than 10 cm. removed from the display screen 10, the cursor and display controller 28 deems that the user's finger 34 is not within the detection zone and the icons 40 and 42 are not activated (indicated by the cross-hatching). When the user's finger 34 enters the zone A (see FIG. 2), the cursor and display controller 28 acknowledges the same and activates the icons 40 and 42 allowing the user to select the desired output "C" or "D" (as shown in FIG. 3B). However, if the user continues to advance his/her finger 34 to the point where it enters the zone F, the cursor and display controller 28 senses this entry into zone F and deactivates the icons 40 and 42 (again, as shown in FIG. 3A).

As an alternate embodiment (or in addition to the above), when the user's finger 34 enters the zone A, the cursor and display controller 28 activates a first audible sound using annunciator 44, as shown in FIG. 1, to inform the user that the system is activated. When the user's finger 34 then enters the zone F, the cursor and display controller 28 may activate a second audible sound using annunciator 44. The second audible sound may be generated as either a continuous sound that is terminated as soon as the user's finger exits the zone F, or a sporadic audible sound generated at the moment of entry into the zone F. In the latter case, if the user's finger enters zone A after it has been in zone F, the first audible sound is generated.

Figure 4:
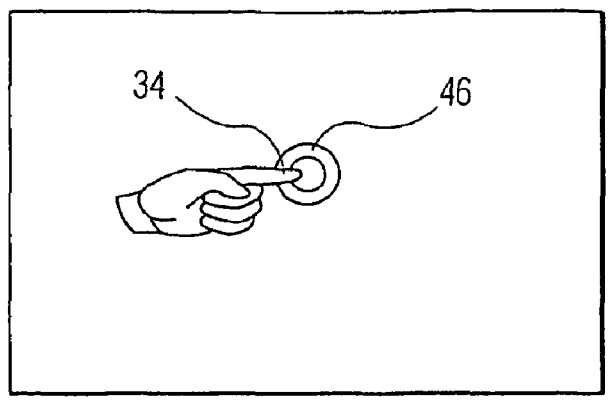
FIG. 4 shows a ripple cursor activated by the presence of a user's finger in the allowed zone.

In a further alternate embodiment (or in addition to the above embodiments), when the user's finger 34 enters the zone A, the cursor and display controller 28 may cause the OSD 30 to generate a cursor on the display screen 10 tracking the coordinates of the user's finger 34. This cursor may take the form of circular ripples 46 similar to those that would appear when an object enters a pool of water (see FIG. 4). However, any man skilled in the art would recognize that there exist a wide variety of different visualizations of a cursor available that may be used beyond the ripple visualization described here. It should be appreciated that the invention is not restricted to using the ripple cursor visualization only. The cursor and display controller 28 then causes this ripple cursor 46 to track the coordinate position of the user's finger 34 while the user's finger 34 is in the zone A. If the user's finger 34 enters the zone F (or exits the zone A), the cursor and display controller 28 causes the OSD 30 to cease generating the ripple cursor 46, at least until the user's finger 34 re-enters the zone A.

Figure 5A:
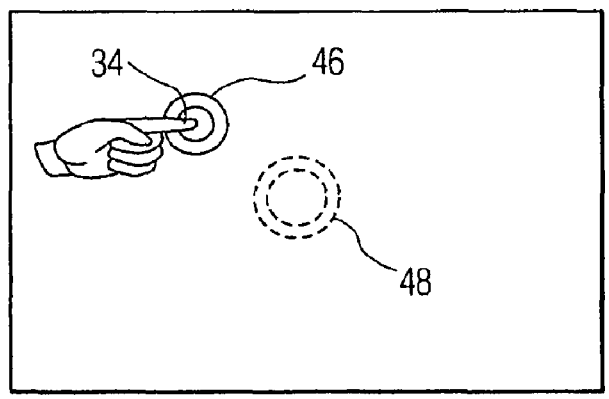
FIGS. 5A and 5B show the ripple cursor activated by the presence of a user's in finger in the allowed zone, along with a shadow of the ripple cursor.
Figure 5B:
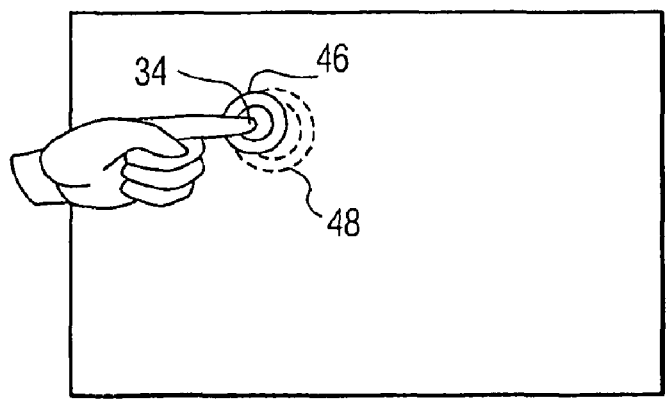

In a further alternative embodiment as shown in FIGS. 5A and 5B, when the user's finger 34 enters the zone A, the cursor and display controller 28 causes the OSD 30 to generate a cursor on the display screen 10 having the form of a cursor 46 having a shadow 48. Depending on the Z coordinate of the user's finger detected by the sensor controller 26, the cursor's shadow can be displayed closer or further away from the cursor. The closer the user's finger is to the display, the closer the shadow will be to the cursor. This is graphically shown in FIGS. 5A and 5B in which FIG. 5A shows the cursor 46 and shadow 48 when the user's finger first enters the zone A, and in which FIG. 5B shows the cursor 46 substantially overlying the shadow 48 when the user's finger 34 nears the display screen (indicated by a larger image of the user's hand). This has the advantage of visually showing the user the relative distance between his/her finger and the display, thus providing continuous visual feedback. After the user has entered the forbidden zone F, the image of the cursor can be visually modified to visually warn the user, e.g., the cursor can, in this case, start glowing red.

In addition to the above embodiments, when the user's finger 34 enters the zone A and its X,Y coordinates are within the "target zone" of a button, e.g., button "C" (or any other GUI control), the button demonstrates the change of its state and displays a "pressed-in" state (or it is highlighted) indicating to the user that he/she is above an active GUI control. The user then can either move his/her finger away from the GUI control target area which will return the GUI control into its initial state, or the user can activate the button, e.g., to select the output "C". Activation can be done in many alternative ways. As an example, the user can hold his/her finger above the button longer than a predefined time-out, after which the button is activated and the corresponding output is generated. Alternatively, the user can move his/her finger away from the button in a direction perpendicular to the display, and as the user's finger crosses the first threshold while staying within the activation region defined for that button, the button is activated. It should be appreciated that the invention is not restricted to using the two described exemplary mechanisms for button activation only. Many other alternatives are possible that fall within the scope of the current invention.

Although this invention has been described with reference to particular embodiments, it will be appreciated that many variations will be resorted to without departing from the spirit and scope of this invention as set forth in the appended claims. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts is intended to be required unless specifically indicated.

The invention claimed is:

1. A method for preventing staining of a display screen by a user's finger, said method comprising the steps of:

determining a first threshold distance from a surface of the display screen within which a user's finger may be detected;

determining a second threshold distance from the surface of the display screen within which a user's finger may be detected, said second threshold distance being shorter than said first threshold distance;

first detecting when a user's finger is within said first threshold distance;

first indicating to said user, upon a detection in said first detecting step, that said user's finger has entered a zone (A) proximate to the surface of the display screen where interaction with a graphical user interface (GUI) is enabled, said GUI enabling manipulating various display functions by movements of the user's finger;

second detecting when a user's finger is within said second threshold distance; and second indicating to said user, upon a detection in said second detecting step, that said user's finger has entered a forbidden zone (F) proximate to the surface of the display screen where interaction with the graphical user interface is disabled to encourage the user not to touch the surface of the display screen.

2. The method as claimed in claim 1, wherein said method further comprises the steps:

third detecting when a user's finger exceeds said second threshold distance, whereby said user's finger is no longer within the forbidden zone (F), after a detection in said second detecting step; and third indicating to said user, upon a detection in said third detecting step, that said user's finger has exited the forbidden zone (F).

3. The method as claimed in claim 1, wherein said indicating steps further comprise generating an audible sound.

4. The method as claimed in claim 3, wherein said audible sound has a fixed predetermined duration.

5. The method as claimed in claim 2, wherein said second indicating step comprises inactivating the GUI and generating a continuous audible sound, and wherein said third indicating step comprises reactivating the GUI and terminating said continuous audible sound.

6. The method as claimed in claim 1, wherein said first indicating step further comprises generating a cursor tracking the coordinates of the user's finger, and said second indicating step comprises ceasing to generate said cursor.

7. The method as claimed in claim 1, wherein said first indicating step further comprises generating a cursor tracking the coordinates of the user's finger, and generating a virtual shadow of said cursor, said virtual shadow tracking movements of said cursor and being shifted a predetermined amount from the coordinates of the cursor when said user's finger enters the zone (A) proximate to the surface of the display screen, the amount of said shift decreasing as said user's finger approaches said second threshold distance.

8. The method as claimed in claim 7, wherein said second indicating step comprises modifying an appearance of said cursor to visually warn the user.

9. The method as claimed in claim 1, wherein said GUI includes at least one icon representing an executable function for selective activation by the user, and said method further comprises the steps of:

detecting when said user's finger overlies said at least one icon; and activating said icon when said user's finger has been detected overlying said at least one icon for longer than a predetermined amount of time.

10. The method as claimed in claim 1, wherein said GUI includes at least one icon representing an executable function for selective activation by the user, and said method further comprises the steps of:

detecting when said user's finger overlies said at least one icon; and activating said icon when said user's finger is moved perpendicularly away from the display screen.

11. An apparatus for preventing staining of a display screen by a user's finger, said apparatus comprising:

a 3-D sensor array for detecting horizontal and vertical coordinates of a user's finger relative to said display screen, and a distance said user's finger is removed from a surface of said display screen;

means for determining a first threshold distance from the surface of the display screen within which a user's finger may be detected;

means for determining a second threshold distance from the surface of the display screen within which a user's finger may be detected, said second threshold distance being shorter than said first threshold distance;

first detecting means coupled to said 3-D sensor array for detecting when a user's finger is within said first threshold distance and within an enabling zone (A);

means for activating a graphic user interface (GUI) of said display screen upon a detection by said first detecting means, said GUI enabling manipulating various display functions by movements of the user's finger;

second detecting means also coupled to said 3-D sensor array for detecting when a user's finger is within said second threshold distance; and means for indicating to said user, upon a detection by said second detecting means, that said user's finger has entered a forbidden zone (F) proximate to the surface of the display screen, wherein responsive to the detection by said second detecting means, said GUI activating means further for deactivating the GUI to encourage the user not to touch the surface of the display screen.

12. The apparatus as claimed in claim 11, wherein said 3-D sensor array is a capacitance sensing array.

13. The apparatus as claimed in claim 11, wherein said activating means causes said GUI to generate a visual cursor tracking the position of the user's finger relative to the display screen.

14. The apparatus as claimed in claim 13, wherein said indicating means causes said GUI to cease generating said visual cursor.

15. The apparatus as claimed in claim 11, wherein said 3-D sensor array comprises:
   a first plurality of optical emitters and detectors arranged around the periphery of the display screen for forming a plurality of intersecting light paths thereby establishing a first virtual touch screen; and
   a second plurality of optical emitters and detectors also arranged around the periphery of the display screen for forming a plurality of intersection light paths thereby establishing a second virtual touch screen,
   wherein said means for determining said first threshold distance comprises positioning said first plurality of emitters and detectors such that said first virtual touch screen is at said first threshold distance,
   and wherein said means for determining said second threshold distance comprises positioning said second plurality of emitters and detectors such that said second virtual touch screen is at said second threshold distance.

16. The apparatus as claimed in claim 11, wherein said activating means causes said GUI to generate a cursor tracking the coordinates of the user's finger, and to generate a virtual shadow of said cursor, said virtual shadow tracking movements of said cursor and being shifted a predetermined amount from the coordinates of the cursor when said user's finger enters the zone (A) proximate to the screen, the amount of said shift decreasing as said user's finger approaches said second threshold distance.

17. The apparatus as claimed in claim 16, wherein said indicating means causes said GUI to change an appearance of said cursor to visually warn the user.

18. The apparatus as claimed in claim 11, wherein said GUI includes at least one icon representing an executable function for selective activation by the user, and said apparatus further comprises:
   means for detecting when said user's finger overlies said at least one icon; and
   means for activating said icon when said user's finger has been detected overlying said at least one icon for longer than a predetermined amount of time.

19. The apparatus as claimed in claim 11, wherein said GUI includes at least one icon representing an executable function for selective activation by the user, and said apparatus further comprises:
   means for detecting when said user's finger overlies said at least one icon; and
   means for activating said icon when said user's finger is moved perpendicularly away from the display screen at the moment of crossing the first threshold distance while the user's finger X and Y coordinates are still within the an activation region in an XY plane defined for said icon.

* * * * *